(12) United States Patent
Li et al.

(10) Patent No.: US 11,360,583 B2
(45) Date of Patent: *Jun. 14, 2022

(54) ELECTROMAGNETIC FOUNTAIN PEN

(71) Applicant: HANVON UGEE TECHNOLOGY CO., LTD., Shenzhen Guangdong (CN)

(72) Inventors: Yuanzhi Li, Shenzhen Guangdong (CN); Liming Deng, Shenzhen Guangdong (CN)

(73) Assignee: HANVON UGEE TECHNOLOGY CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/277,650

(22) PCT Filed: Oct. 18, 2018

(86) PCT No.: PCT/CN2018/110835
§ 371 (c)(1),
(2) Date: Mar. 18, 2021

(87) PCT Pub. No.: WO2020/056832
PCT Pub. Date: Mar. 26, 2020

(65) Prior Publication Data
US 2021/0349557 A1    Nov. 11, 2021

(30) Foreign Application Priority Data

Sep. 19, 2018 (CM) .................. 201811097465.8

(51) Int. Cl.
*G06F 3/046* (2006.01)
*G06F 3/0354* (2013.01)
*G06F 3/038* (2013.01)

(52) U.S. Cl.
CPC ........ *G06F 3/03545* (2013.01); *G06F 3/0383* (2013.01)

(58) Field of Classification Search
CPC .... G06F 3/03545; G06F 3/0383; G06F 3/046; B43K 29/08; B43K 8/22; B43K 27/00; H01F 27/24; H01F 27/28
See application file for complete search history.

(56) References Cited

U.S. PATENT DOCUMENTS

| 5,565,632 A | 10/1996 | Ogawa |
| 2004/0125089 A1* | 7/2004 | Chao .................. G06F 3/03545 345/179 |

(Continued)

FOREIGN PATENT DOCUMENTS

| CN | 200939759 Y | 8/2007 |
| CN | 101901046 A | 12/2010 |

(Continued)

OTHER PUBLICATIONS

First Office Action, The State Intellectual Property Office of People's Republic of China, Application No. 201811097465.8, dated May 13, 2019, 14 pages.

(Continued)

*Primary Examiner* — Lunyi Lao
*Assistant Examiner* — Jarurat Suteerawongsa
(74) *Attorney, Agent, or Firm* — Vorys, Sater, Seymour and Pease LLP

(57) ABSTRACT

Disclosed is an electromagnetic fountain pen, which includes a pen core, a housing, and a pen body located in the housing, the housing includes a front housing and a rear housing, the pen body includes a first iron core and an iron core holder, the iron core holder is provided with a pen core clamp link, a second iron core, and a third iron core, coils are wound outside the first iron core and the second iron core, the first iron core is close to a pen tip of the pen core, the pen (Continued)

core is configured to pass through a center of the first iron core, and then is clamped by one end of the pen core clamp link.

17 Claims, 3 Drawing Sheets

(56) References Cited

U.S. PATENT DOCUMENTS

| | | | |
|---|---|---|---|
| 2011/0084846 | A1 | 4/2011 | Li et al. |
| 2014/0043300 | A1* | 2/2014 | Lien .................... G06F 3/03545 345/179 |
| 2014/0085270 | A1* | 3/2014 | Obata ................. G06F 3/03545 345/179 |
| 2015/0212605 | A1* | 7/2015 | Lien .................... G06F 3/03545 345/179 |
| 2015/0324018 | A1* | 11/2015 | Hinson ................. G06F 3/0446 345/179 |
| 2016/0018912 | A1* | 1/2016 | Kaneda .................. G06F 3/033 345/179 |
| 2018/0039345 | A1 | 2/2018 | Obata |

FOREIGN PATENT DOCUMENTS

| | | |
|---|---|---|
| CN | 103631399 A | 3/2014 |
| CN | 103677337 A | 3/2014 |
| CN | 204066032 U | 12/2014 |
| CN | 204270250 U | 4/2015 |
| CN | 204440332 U | 7/2015 |
| CN | 106354285 A | 1/2017 |
| CN | 206021215 U | 3/2017 |
| CN | 206209627 U | 5/2017 |
| CN | 107521259 A | 12/2017 |
| CN | 107924211 A | 4/2018 |
| CN | 208834271 U | 5/2019 |
| CN | 208834272 U | 5/2019 |
| CN | 209305180 U | 8/2019 |
| CN | 109032396 B | 3/2020 |
| DE | 2305002 A1 | 8/1973 |
| DE | 19602851 A1 | 7/1997 |
| EP | 1331547 A1 | 7/2003 |
| JP | H0496212 A | 3/1992 |
| JP | H08227336 A | 9/1996 |
| TW | M445213 U | 1/2013 |

OTHER PUBLICATIONS

International Search Report, China National Intellectual Property Administration (ISA/CN), PCT/CN2018/110835, dated Jun. 13, 2019, 4 pages.
The Second Office Action, The State Intellectual Property Office of People's Republic of China, Application No. 201811097465.8, dated Jan. 10, 2020, 16 pages.
The Third Office Action, The State Intellectual Property Office of People's Republic of China, Application No. 201811097465.8, dated Sep. 16, 2020, 13 pages.
Written Opinion of the International Search Authority, PCT/CN2018/110835, 4 pages.
International Preliminary Report on Patentability and Written Opinion of the International Searching Authority dated Mar. 23, 2021 to Hanvon Ugee Technology Co., Ltd. for PCT/CN2018/110835 filed Oct. 18, 2018.
Search Report, URL: <cpquery.cnipa.gov.cn>, retrieved from the Internet dated Feb. 28, 2022.
Supplementary Search Report, URL: <cpquery.cnipa.gov.cn>, retrieved from the Internet dated Feb. 28, 2022.
Supplementary European Search Report completed Jul. 19, 2021 for EP18933769.

* cited by examiner

ELECTROMAGNETIC FOUNTAIN PEN

CROSS-REFERENCE TO RELATED APPLICATIONS

This application is a national stage filing under 35 U.S.C. § 371 of international application number PCT/CN2018/110835, filed Oct. 18, 2018, which claims priority to Chinese patent application No. 201811097465.8, filed Sep. 19, 2018. The contents of these applications are incorporated herein by reference in their entirety.

TECHNICAL FIELD

The present disclosure relates to the field of information input devices, and more particularly, to an electromagnetic fountain pen.

BACKGROUND

With the continuous development of digital electronic information technology, human-computer interaction is getting closer to life. Electromagnetic touch control is increasingly pursued by people because of being capable of perfectly presenting original handwriting input.

Main devices for electromagnetic touch control include an antenna board, a control board, and an electromagnetic pen. As a key component of the electromagnetic touch control, the electromagnetic pen can not only be operated by point control, but also use a pressure-sensitive characteristic thereof to paint and practice writing.

The electromagnetic pen transmits an electromagnetic wave based on an internal oscillation circuit thereof and the antenna board on a device applying an electromagnetic touch control technology to position the electromagnetic pen. The electromagnetic pen is generally composed of an inductor and a capacitor, wherein the inductor is composed of an iron core and a coil, and a frequency of the electromagnetic pen may be changed by regulating an inductance or capacitance value.

Although an electromagnetic input technology has been widely used in a tablet, a mobile phone, an electronic paper book, a handwriting board, an electronic whiteboard, and other electronic devices, a common electromagnetic pen can only be operated on a corresponding electromagnetic device, and cannot be used for writing on paper. Therefore, an electromagnetic fountain pen with both electromagnetic writing and ink writing functions has appeared in the market.

Currently, the electromagnetic fountain pen is mostly implemented by a variable capacitance technology, but the variable capacitance technology is limited by an accuracy and a price of a variable capacitor, such that it is difficult to popularize the electromagnetic fountain pen in performance, price, and other aspects. In addition, the electromagnetic fountain pen is composed of many parts, each part has its own manufacturing error, and each part is made of different materials. Therefore, a problem of size inconsistency often occurs during assembly and production, which leads to a condition that an actual size of the electromagnetic pen in delivery is smaller than or larger than a standard size, thereby being not conducive to mass production.

SUMMARY

In order to solve the above technical problem, the present disclosure aims to provide an electromagnetic fountain pen with a low price and a good size consistency.

The technical solution adopted in the present disclosure is as follows: an electromagnetic fountain pen includes a pen core, a housing, and a pen body located in the housing, wherein the housing includes a front housing and a rear housing, the pen body includes a first iron core and an iron core holder, the iron core holder is provided with a pen core clamp link, a second iron core, and a third iron core, coils are wound outside the first iron core and the second iron core, the first iron core is close to a pen tip of the pen core, the pen core is configured to pass through a center of the first iron core, and then is clamped by one end of the pen core clamp link, and the other end of the pen core clamp link is configured to pass through a center of the second iron core, and then drive the third iron core to move; and a PCBA circuit board is disposed in the rear housing, and an elastic structure is disposed between the PCBA circuit board and the iron core holder.

Further, the pen body further comprises a pen core rod, and the pen core is configured to pass through the center of the first iron core and a center of the pen core rod in sequence, and then is clamped by one end of the pen core clamp link.

Further, a groove is formed on the iron core holder, and the groove is matched with the second iron core.

Further, the second iron core is located inside the iron core holder.

Further, a screw post is disposed behind the iron core holder, a screw hole is disposed in the PCBA circuit board, and the screw post is fixed in the screw hole by a screw.

Further, the iron core holder includes a front portion of the iron core holder and a tail portion of the iron core holder, and the tail portion of the iron core holder is combined with the front portion of the iron core holder in a rotating manner.

Further, a step is disposed on the pen core clamp link.

Further, a PCBA peripheral fixing clamping position is disposed on the PCBA circuit board.

Further, the elastic structure adopts a silicone ring.

Further, an outer diameter of the second iron core is smaller than that of the third iron core.

The present disclosure has the beneficial effects that: the pen body includes the iron core holder and the first iron core with the wound coil, the iron core holder is provided with the pen core clamp link, the third iron core, and the second iron core with the wound coil, a distance between the second iron core and the third iron core is changed by movement of the pen core cooperated with the pen core clamp link so as to change inductance of the passive electromagnetic fountain pen, and then the frequency of the fountain pen is changed, and a variable inductance technology is used to replace a variable capacitance technology, such that a price is lower, and a performance is better; the elastic structure is additionally disposed between the iron core holder of the front housing and the PCBA circuit board of the rear housing, an assembly error is eliminated by an elastic margin of the elastic structure during assembly of the front and rear housings with the pen body, such that an actual size of the electromagnetic fountain pen in delivery is equal to a standard size, thereby being conductive to mass production; and meanwhile, the elastic structure may also play a role of buffering, thereby reducing a probability that the parts are damaged due to mechanical shock or wear, and prolonging a service life of the electromagnetic fountain pen.

DETAILED DESCRIPTION

Figure 1:
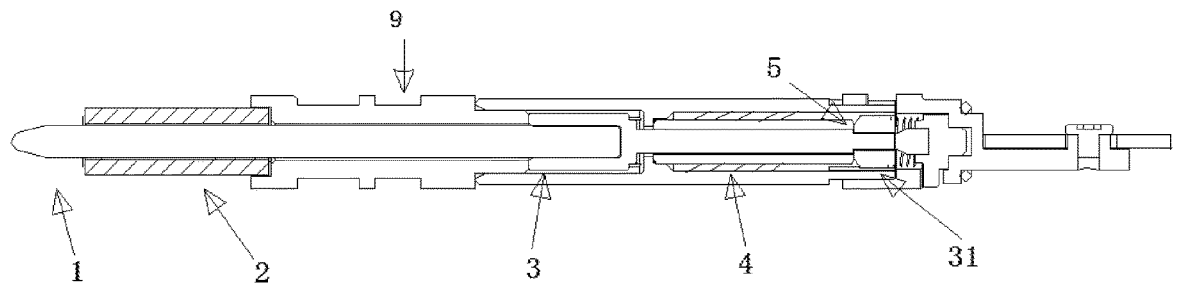
FIG. 1 is a schematic structural diagram of an electromagnetic fountain pen of the present disclosure.

The present disclosure is further explained hereinafter with reference to the accompanying drawings and the specific embodiments of the specification.

Referring to FIG. 1 to FIG. 4, an electromagnetic fountain pen includes a pen core 1, a housing, and a pen body located in the housing. The housing includes a front housing (not shown) and a rear housing (not shown), the pen body includes a first iron core 2 and an iron core holder, the iron core holder is provided with a pen core clamp link 3, a second iron core 4, and a third iron core 5, coils are wound outside the first iron core 2 and the second iron core 4, the first iron core 2 is close to a pen tip of the pen core 1, the pen core 1 passes through a center of the first iron core 2, and then is clamped by one end of the pen core clamp link 3, and the other end of the pen core clamp link 3 passes through a center of the second iron core 4, and then drives the third iron core to move. A PCBA circuit board 7 is disposed in the rear housing, and an elastic structure 8 is disposed between the PCBA circuit board 7 and the iron core holder.

In the present disclosure, a three-iron-core structure is used to change inductance, wherein the first iron core 2, which is an iron core with a wound coil, is close to the pen tip of the pen core, and is responsible for receiving and transmitting energy. Moreover, the second iron core 4 is an iron core with a wound coil, and the third iron core 5 is an iron core without a wound coil. A through hole in the center of the second iron core 4 is larger than a through hole in a center of the third iron core 5. The two iron cores are disposed behind the pen core, and the second iron core 4 is closer to the pen tip of the pen core than the third iron core 5. This structure may provide an enough space behind the third iron core 5 to design an internal elastic component, and other structures, such that the pen tip has an excellent force feedback performance.

Figure 3:
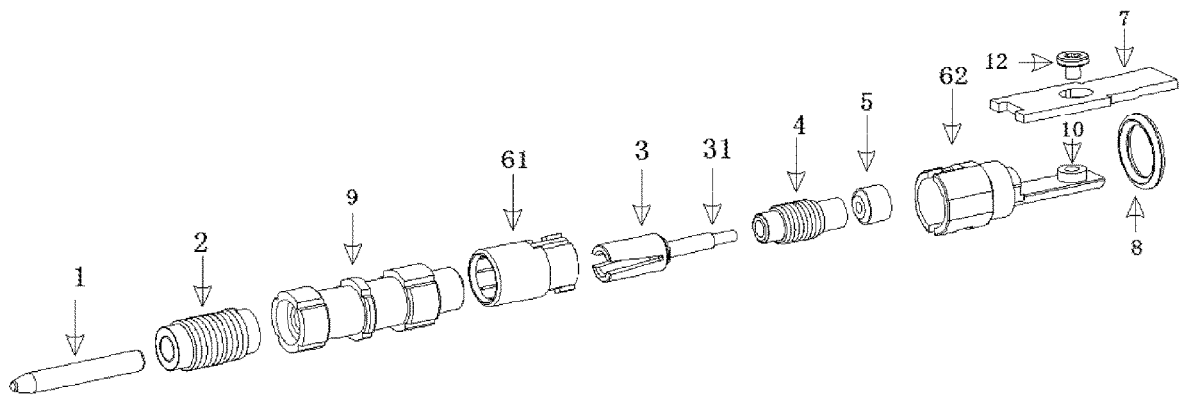
FIG. 3 is an exploded view of a structure of an embodiment of the electromagnetic fountain pen of the present disclosure.
Figure 4:
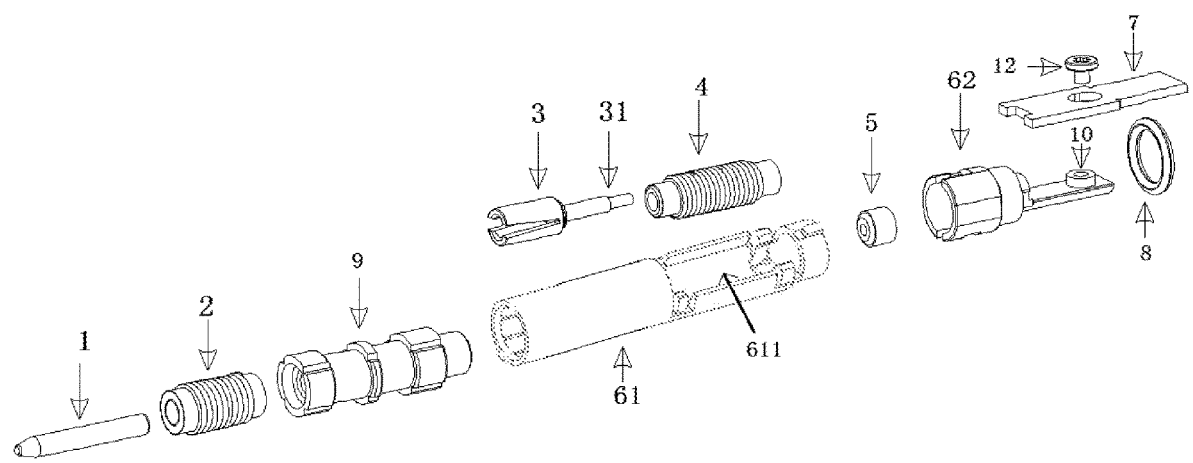
FIG. 4 is an exploded view of a structure of another embodiment of the electromagnetic fountain pen of the present disclosure.

The pen core clamp link 3 has pen core clamping and linking functions. As shown in FIG. 3 or FIG. 4, one end of the pen core clamp link 3 may clamp the pen core 1, and the other end of the pen core clamp link 3 has the linking function, and is an elongated plastic rod. The pen core clamp link 3 may be loaded from a direction of the pen tip of the iron core holder.

When the pen core is stressed, the pen core 1 passes through the center of the first iron core 2, and then is clamped by one end of the pen core clamp link 3, and the other end of the pen core clamp link 3 passes through the center of the second iron core 4, and then pushes the third iron core 5 to move, such that a distance between the second iron core 4 and the third iron core 5 is changed, resulting in a change of an inductance value.

Figure 6:
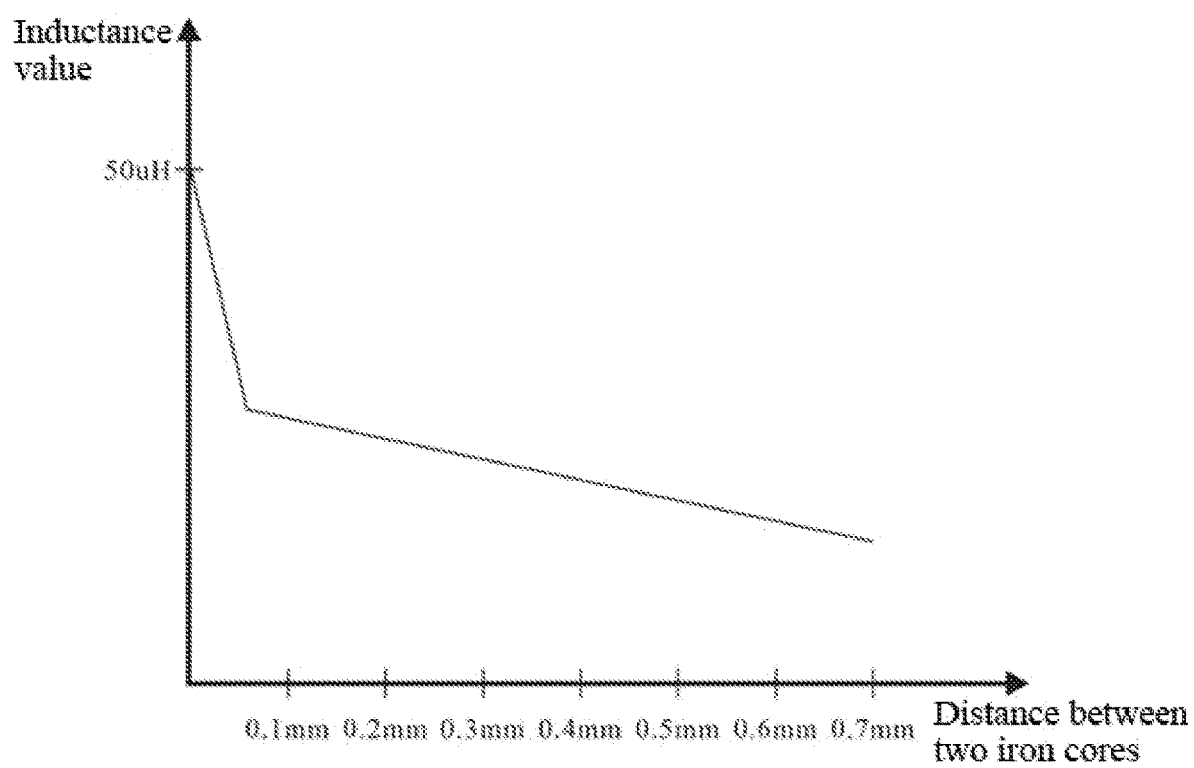
FIG. 6 is a curve graph showing a relationship between a distance between two iron cores and an inductance value of a coil.

As shown in FIG. 6, in the present disclosure, when the second iron core 4 and the third iron core 5 are tightly attached to each other, an air gap between the two iron cores is extremely small. When the iron cores are slightly pushed by the pen core, the air gap is generated between the two iron cores. At the moment, a magnetic resistance is added on a magnetic circuit (i.e., a magnetic field closed loop), and the inductance value can be greatly reduced. In the present disclosure, by utilizing the characteristic, when the pen core is moved slightly, a large enough change of a frequency of the pen can be generated. In a usage occasion of the fountain pen, an electronic handwriting is capable of appearing during painting lightly, with a same use feeling as a real fountain pen and a real pencil.

The PCBA circuit board 7 has a fixed capacitance value, two coil-wound inductors of the first iron core 2 and the second iron core 4 are connected in parallel with a capacitor on the PCBA circuit board 7. An antenna board emits a frequency to charge the pen initially, when the antenna board stops emitting, the pen may be changed from receiving energy to emitting energy, and the coil-wound inductor on the pen is changed, and is connected in parallel with the fixed capacitor on the PCBA circuit board 7, which may change a frequency emitted by the pen, such that the antenna board is capable of obtaining different frequencies of the pen, and different changes of a pressure value of the pen are generated.

Figure 2:
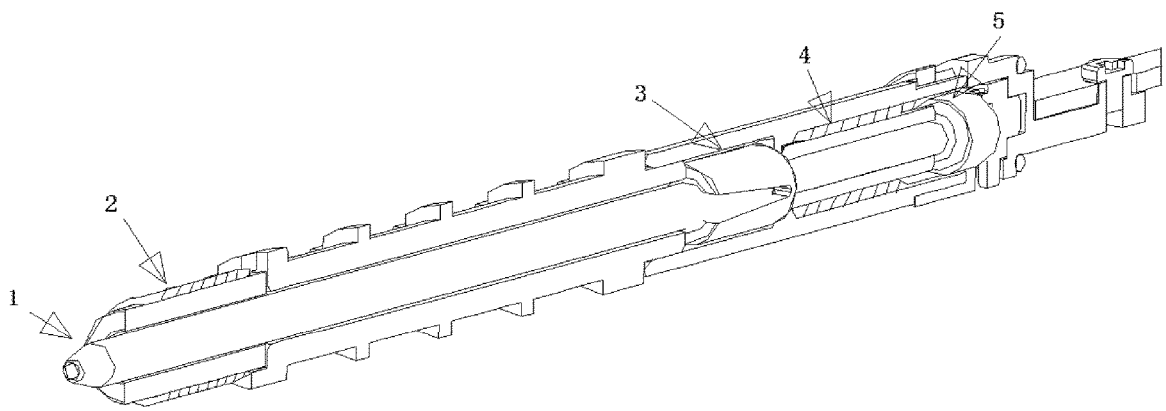
FIG. 2 is a sectional view of the electromagnetic fountain pen of the present disclosure.

As shown in FIG. 1 and FIG. 2, the first iron core 2, the second iron core 4, and the third iron core 5 of the present disclosure may all be a hollow structure. The pen tip of the pen core 1 is located on the left, and the tail end is located on the right. As shown in FIG. 3 or FIG. 4, the iron core holder includes a front portion 61 of the iron core holder and a bottom portion 62 of the iron core holder matched with each other, the second iron core 4 may be fixed on the front portion 61 of the iron core holder from a direction of the pen tail, while the third iron core 5 is located behind the second iron core 4, is installed inside the iron core holder, and may move in the iron core holder. The iron core clamp link 3 passes through the center of the second iron core 4, and then pushes the third iron core 5 to move in the iron core holder.

The elastic structure 8 has a certain elastic margin, which is used for eliminating and absorbing an error in an axial direction from the pen tip to the pen tail of the electromagnetic fountain pen, such that an actual size of the electromagnetic pen in delivery is equal to a standard size. In addition, the elastic structure 8 may also play a role of buffering, which prevents the PCBA circuit board 7, the iron core holder, and other parts from being damaged due to mechanical shock or wear, thereby prolonging a service life. The elastic structure 8 may be implemented by a rubber ring (such as a silicone ring), an elastic metal sheet, a thin film sheet, and other elastic structures.

The pen core 1 of the present disclosure may be implemented by a pen core of an existing fountain pen.

As shown in FIG. 1 to FIG. 4, further, as a preferred embodiment, the pen body further includes a pen core rod 9, and the pen core 1 passes through the center of the first iron core 2 and a center of the pen core rod 9 in sequence, and then is clamped by one end of the pen core clamp link 3.

Specifically, the pen core rod 9 is located between the first iron core 2 and the pen core clamp link 3, and may protect the pen core 1. The pen core clamp link 3 is loaded from a direction of the pen tip of the iron core holder during assembling first. After the pen core clamp link 3 is loaded, the pen core rod 9 is combined with the front portion 61 of the iron core holder from the direction of the pen tip.

As shown in FIG. 4, further, as a preferred embodiment, a groove 611 is formed on the iron core holder, and the groove 611 is matched with the second iron core 4. Specifically, the second iron core 4 may be installed and fixed to the front portion of the iron core holder by the groove 611 (which means that the second iron core is loaded in the front portion 61 of the iron core holder from a side face).

Referring to FIG. 3, further, as a preferred embodiment, the second iron core 4 is located inside the iron core holder. Specifically, the second iron core 4 may be completely installed and fixed inside the iron core holder.

Figure 5:
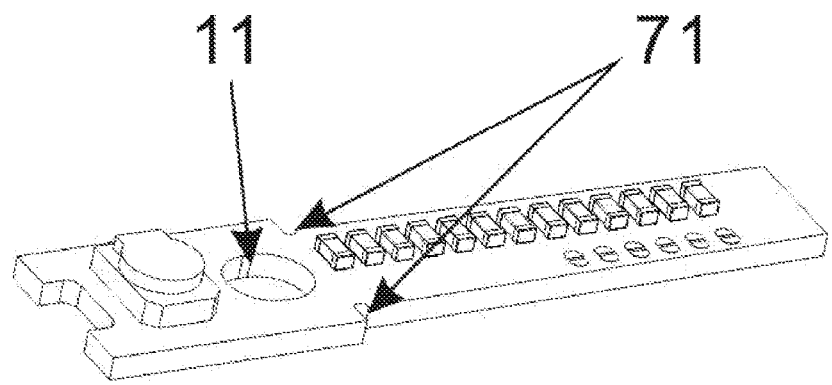
FIG. 5 is a schematic structural diagram of a PCBA circuit board.

As shown in FIG. 3 to FIG. 5, further, as a preferred embodiment, a screw post 10 is disposed behind the iron core holder, a screw hole 11 is disposed in the PCBA circuit board 7, and the screw post 10 is fixed in the screw hole 11 by a screw 12.

Specifically, the screw hole 11 may be an elliptical hole, and the screw post 10 may be a cylinder, such that the PCBA circuit board 7 is also capable of moving towards the pen tip or the pen tail for a small distance after the screw 12 is tightened (a characteristic of the elliptical hole), thereby facilitating position regulation during installation and reducing installation errors.

Referring to FIG. 3 or FIG. 4, further, as a preferred embodiment, the iron core holder includes a front portion 61 of the iron core holder and a tail portion 62 of the iron core holder, and the tail portion 62 of the iron core holder is combined with the front portion 61 of the iron core holder in a rotating manner.

Referring to FIG. 3 or FIG. 4, further, as a preferred embodiment, a step 31 is disposed on the pen core clamp link 3.

According to the pen core clamp link 3 of the present disclosure, one end of the pen core clamp link clamps the pen core 1, and the other end of the pen core clamp link is an elongated plastic rod with a step difference. When the pen core 1 is stressed, the pen core clamp link 3 has a linking function, a tail end of the link is provided with one step 31, which is capable of passing through the center of the second iron core 4, and the third iron core 5 is pushed to move by the step 31.

Referring to FIG. 5, further, as a preferred embodiment, a PCBA peripheral fixing clamping position 71 is disposed on the PCBA circuit board 7.

As shown in FIG. 4 and FIG. 5, when the pen core 1, the first iron core 2, the second iron core 4, the third iron core 5, the iron core holder, and other components are assembled in the housing, the rear housing of the housing may be pushed to the PCBA peripheral fixing clamping position 71 to be fixed, and pushed towards the pen tip. Since the pen body is placed in the front and rear housings, when the front and rear housings are combined, the rear housing may press the whole pen body towards a direction of the front housing (i.e., the direction of the pen tip) through the PCBA peripheral fixing clamping position 71, such that the front housing and the rear housing can be tightly attached or connected.

Further, as a preferred embodiment, the elastic structure adopts a silicone ring.

Further, as a preferred embodiment, an outer diameter of the second iron core is smaller than that of the third iron core.

In the present disclosure, the outer diameter of the third iron core without the wound coil is larger than that of the second iron core with the wound coil. The outer diameter of the third iron core is reduced close to one end of the second iron core, such that an overall appearance of the pen may not be abrupt due to the third iron core without the wound coil in the interior, thereby having a better consistency in overall appearance.

Further, as a preferred embodiment, a first through hole is formed in the center of the second iron core, a second through hole is formed in a center of the third iron core, and a diameter of the first through hole is larger than that of the second through hole.

In the present disclosure, the diameter of the first through hole of the second iron core is larger than that of the second through hole of the third iron core, such that the pen core is capable of pushing the third iron core by the step at the tail end of the pen core clamp link.

The working principle of the electromagnetic fountain pen of the present disclosure is as follows: when the pen tip of the pen core is stressed during writing, the pen core passes through the center of the first iron core to be clamped by one end of the pen core clamp link, the other end of the pen core clamp link passes through the center of the second iron core, and the third iron core is pushed to move by the step, such that different distances are formed between the second iron core and the third iron core, thereby changing an inductance value on the coil of the second iron core. The changed inductor of the second iron core and the inductor of the first iron core are connected in parallel with the fixed capacitor on the PCBA circuit board, such that a frequency emitted by the pen is changed, and different changes of a pressure value of the pen are generated. In addition, in the present disclosure, the elastic structure is additionally disposed between the iron core holder and the PCBA circuit board, such that an assembly error is eliminated by an elastic margin of the elastic structure during assembling the front and rear housings with the pen body, such that an actual size of the electromagnetic pen in delivery is equal to a standard size, thereby being conductive to batch production, reducing a probability that the parts are damaged due to mechanical shock or wear, and prolonging a service life of the electromagnetic pen.

The foregoing describes the preferred embodiments of the present disclosure in detail, but the present disclosure is not limited to the embodiments. Those skilled in the art may further make various equivalent modifications or substitutions without violating the spirit of the present disclosure, and these equivalent modifications or substitutions are all included in the scope defined by the claims of the present application.

What is claimed is:

1. An electromagnetic fountain pen, comprising:
a pen core;
a housing; and
a pen body located in the housing,
wherein the housing comprises a front housing and a rear housing, the pen body comprises a first iron core and an iron core holder, the iron core holder is provided with a pen core clamp link, a second iron core, and a third iron core, coils are wound outside the first iron core and the second iron core, the first iron core is close to a pen tip of the pen core, the pen core is configured to pass through a center of the first iron core, and then is clamped by one end of the pen core clamp link, and the other end of the pen core clamp link is configured to pass through a center of the second iron core, and then drive the third iron core to move; and
wherein a PCBA circuit board is disposed in the rear housing, and an elastic structure is disposed between the PCBA circuit board and the iron core holder;
wherein a screw post is disposed behind the iron core holder, a screw hole is disposed in the PCBA circuit board, and the screw post is fixed in the screw hole by a screw.

2. The electromagnetic fountain pen of claim 1, wherein the pen body further comprises a pen core rod, and the pen core is configured to pass through the center of the first iron core and a center of the pen core rod in sequence, and then is clamped by one end of the pen core clamp link.

3. The electromagnetic fountain pen of claim 2, wherein a PCBA peripheral fixing clamping position is disposed on the PCBA circuit board.

4. The electromagnetic fountain pen of claim 2, wherein an outer diameter of the second iron core is smaller than that of the third iron core.

5. The electromagnetic fountain pen of claim 1, wherein a groove is formed on the iron core holder, and the groove is matched with the second iron core.

6. The electromagnetic fountain pen of claim 5, wherein a PCBA peripheral fixing clamping position is disposed on the PCBA circuit board.

7. The electromagnetic fountain pen of claim 5, wherein an outer diameter of the second iron core is smaller than that of the third iron core.

8. The electromagnetic fountain pen of claim 1, wherein the second iron core is located inside the iron core holder.

9. The electromagnetic fountain pen of claim 8, wherein a PCBA peripheral fixing clamping position is disposed on the PCBA circuit board.

10. The electromagnetic fountain pen of claim 8, wherein an outer diameter of the second iron core is smaller than that of the third iron core.

11. The electromagnetic fountain pen of claim 1, wherein the iron core holder comprises a front portion of the iron core holder and a tail portion of the iron core holder, and the tail portion of the iron core holder is combined with the front portion of the iron core holder in a rotating manner.

12. The electromagnetic fountain pen of claim 11, wherein a PCBA peripheral fixing clamping position is disposed on the PCBA circuit board.

13. The electromagnetic fountain pen of claim 1, wherein a step is disposed on the pen core clamp link.

14. The electromagnetic fountain pen of claim 13, wherein a PCBA peripheral fixing clamping position is disposed on the PCBA circuit board.

15. The electromagnetic fountain pen of claim 1, wherein a PCBA peripheral fixing clamping position is disposed on the PCBA circuit board.

16. The electromagnetic fountain pen of claim 1, wherein the elastic structure adopts a silicone ring.

17. The electromagnetic fountain pen of claim 1, wherein an outer diameter of the second iron core is smaller than that of the third iron core.

* * * * *